United States Patent
Strahan

(10) Patent No.: US 10,640,051 B2
(45) Date of Patent: May 5, 2020

(54) VEHICLE GARMENT RACK

(71) Applicant: Ronald L. Strahan, Edmond, OK (US)

(72) Inventor: Ronald L. Strahan, Edmond, OK (US)

(73) Assignee: RSJS, LLC, Redmond (CA)

( * ) Notice: Subject to any disclaimer, the term of this patent is extended or adjusted under 35 U.S.C. 154(b) by 0 days.

(21) Appl. No.: 16/165,088

(22) Filed: Oct. 19, 2018

(65) Prior Publication Data

US 2019/0118725 A1 Apr. 25, 2019

Related U.S. Application Data

(60) Provisional application No. 62/576,419, filed on Oct. 24, 2017.

(51) Int. Cl.
*B60R 7/10* (2006.01)
*B60R 7/04* (2006.01)

(52) U.S. Cl.
CPC ............... *B60R 7/10* (2013.01); *B60R 7/043* (2013.01)

(58) Field of Classification Search
CPC .................................. B60R 7/10; B60R 7/043
USPC ........................................................ 224/927
See application file for complete search history.

(56) References Cited

U.S. PATENT DOCUMENTS

| | | | |
|---|---|---|---|
| 2,447,908 A | 8/1948 | Hoots | |
| 2,456,303 A | 12/1948 | Mogan | |
| 2,526,285 A | 4/1949 | Schuyler | |
| 2,536,765 A * | 1/1951 | North | B60R 7/10 224/550 |
| 2,550,150 A * | 4/1951 | Hartley | B60R 7/10 224/550 |
| 2,573,275 A | 10/1951 | Richey | |
| 2,583,806 A * | 1/1952 | Batzle | A47C 7/64 224/275 |
| 2,589,611 A * | 3/1952 | Hay | B60R 7/10 224/555 |
| 2,634,892 A * | 4/1953 | Wachowski | B60R 7/10 224/551 |
| 2,640,634 A * | 6/1953 | Francis | B60R 7/10 224/550 |
| 2,675,950 A * | 4/1954 | Porter | B60R 7/10 224/313 |
| 2,728,503 A * | 12/1955 | Kramer | A47G 25/0607 224/547 |

(Continued)

FOREIGN PATENT DOCUMENTS

CN 203005282 U 6/2013

OTHER PUBLICATIONS

Written opinion of the ISA (Russia), PCT Appl. No. PCT/IB2018/058178, international application corresponding to the above-referenced US application, dated Feb. 28, 2019.

*Primary Examiner* — Justin M Larson
(74) *Attorney, Agent, or Firm* — Mary M. Lee

(57) ABSTRACT

A garment rack for a vehicle. The rack includes a horizontal rod for clothes hangers. The front end of the horizontal rod is pivotally supported on the upper end of a vertical rod positioned behind the front seat of the vehicle. The upper end of the vertical rod is secured behind the headrest of the front seat, and the rear end of the horizontal rod is removably attached to the top of the headrest of the rear seat. The horizontal rod is adjustable telescopically so that, as the front or rear seat is moved forward or backward, the rod extends and retracts automatically. The height of the vertical rod also is adjustable.

14 Claims, 5 Drawing Sheets

(56) References Cited

U.S. PATENT DOCUMENTS

| | | | | |
|---|---|---|---|---|
| 2,733,846 | A | * | 2/1956 | Leebow .................... B60R 7/10 |
| | | | | 224/313 |
| 2,926,827 | A | | 3/1960 | Joseph |
| 3,172,541 | A | | 3/1965 | Hiser |
| 3,481,483 | A | * | 12/1969 | Hill .......................... B60R 7/10 |
| | | | | 211/105.3 |
| 3,483,999 | A | * | 12/1969 | Barrett ...................... A47F 5/13 |
| | | | | 211/204 |
| 4,863,081 | A | | 9/1989 | Gabbert |
| 5,058,790 | A | | 10/1991 | LaVelle |
| D328,195 | S | * | 7/1992 | Kotsuka ........................ D6/324 |
| 5,328,068 | A | | 7/1994 | Shannon |
| D358,506 | S | * | 5/1995 | Lara ............................ D12/406 |
| 5,662,253 | A | * | 9/1997 | Goings .................. B60R 5/006 |
| | | | | 224/311 |
| 5,833,081 | A | * | 11/1998 | Smith ................ A47G 25/0664 |
| | | | | 211/86.01 |
| 6,131,749 | A | | 10/2000 | Crockett et al. |
| 6,648,395 | B2 | | 11/2003 | Hoshino |
| 7,143,902 | B2 | * | 12/2006 | Iversen ..................... A47F 7/24 |
| | | | | 211/123 |
| 7,395,997 | B2 | | 7/2008 | Padden |
| 8,573,689 | B2 | | 11/2013 | Golo |
| 8,783,473 | B1 | | 7/2014 | Schosek |
| 2006/0261229 | A1 | * | 11/2006 | Hirota ...................... B60R 7/043 |
| | | | | 248/304 |
| 2008/0156837 | A1 | * | 7/2008 | Brightman ................ B60R 7/10 |
| | | | | 224/313 |
| 2012/0043789 | A1 | * | 2/2012 | Lee .......................... B60N 3/08 |
| | | | | 297/188.06 |
| 2015/0274082 | A1 | | 10/2015 | Khazadian |
| 2019/0118725 | A1 | * | 4/2019 | Strahan ..................... B60R 7/10 |

\* cited by examiner

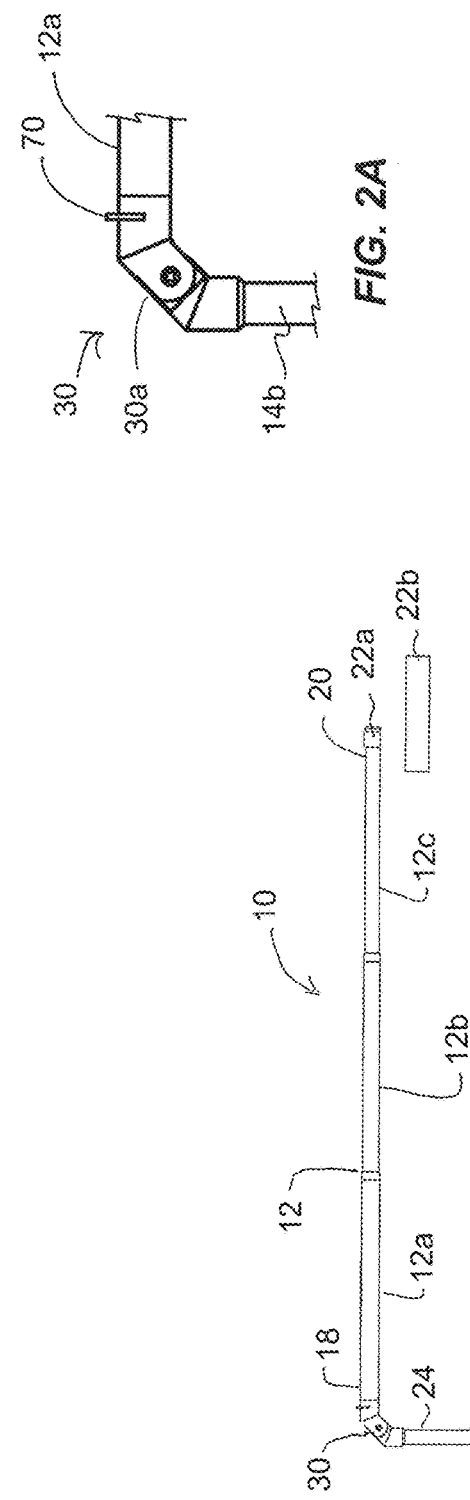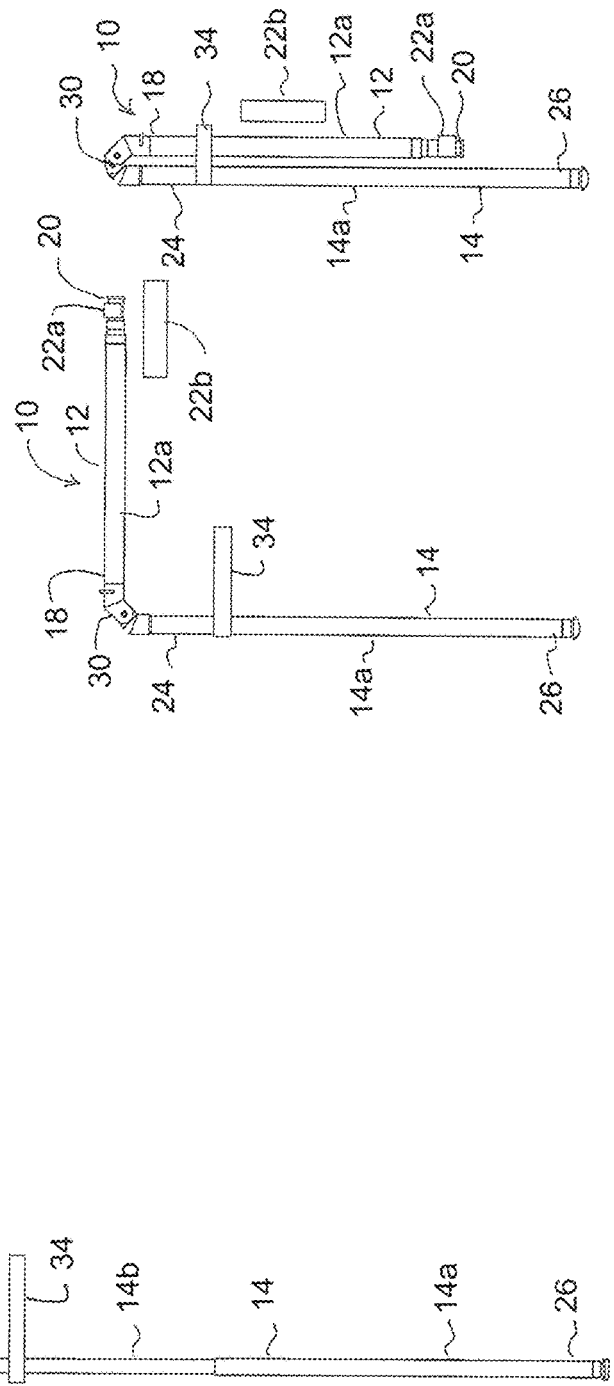

VEHICLE GARMENT RACK

CROSS-REFERENCE TO RELATED APPLICATIONS

This application claims the benefit of U.S. provisional application No. 62/576,419 entitled "Vehicle Garment Rack," filed Oct. 24, 2017, the contents of which are incorporated herein by reference.

FIELD OF THE INVENTION

The present invention relates to racks for supporting clothing items in vehicles.

BRIEF DESCRIPTION OF THE DRAWINGS

The accompanying drawings, which are incorporated into and form a part of the specification, illustrate one or more embodiments of the present invention and, together with this description, serve to explain the principles of the invention. The drawings merely illustrate a preferred embodiment of the invention and are not to be construed as limiting the scope of the invention.

FIG. 2 is a side elevational view of the vehicle garment rack in the fully extended position.

FIG. 2A is an enlarged fragmented view of the pivotal joint between the horizontal rod and vertical leg.

FIG. 3 is a side elevational view of the vehicle garment rack shown in FIG. 2 in the retracted position.

FIG. 4 is a side elevational view of the vehicle garment rack shown in FIG. 2 in the retracted and folded position.

DETAILED DESCRIPTION OF THE PREFERRED EMBODIMENT(S)

Since the automobile became a common mode of transportation, those using it have often needed to carry clothing and other hanging items to and from their destinations. Many types of vehicle clothes racks have been developed to provide a way to carry clothes on hangers and avoid the need to fold and pack the clothing in luggage. The vehicle clothes rack of the present invention offers many advantages over conventional racks.

Figure 1:
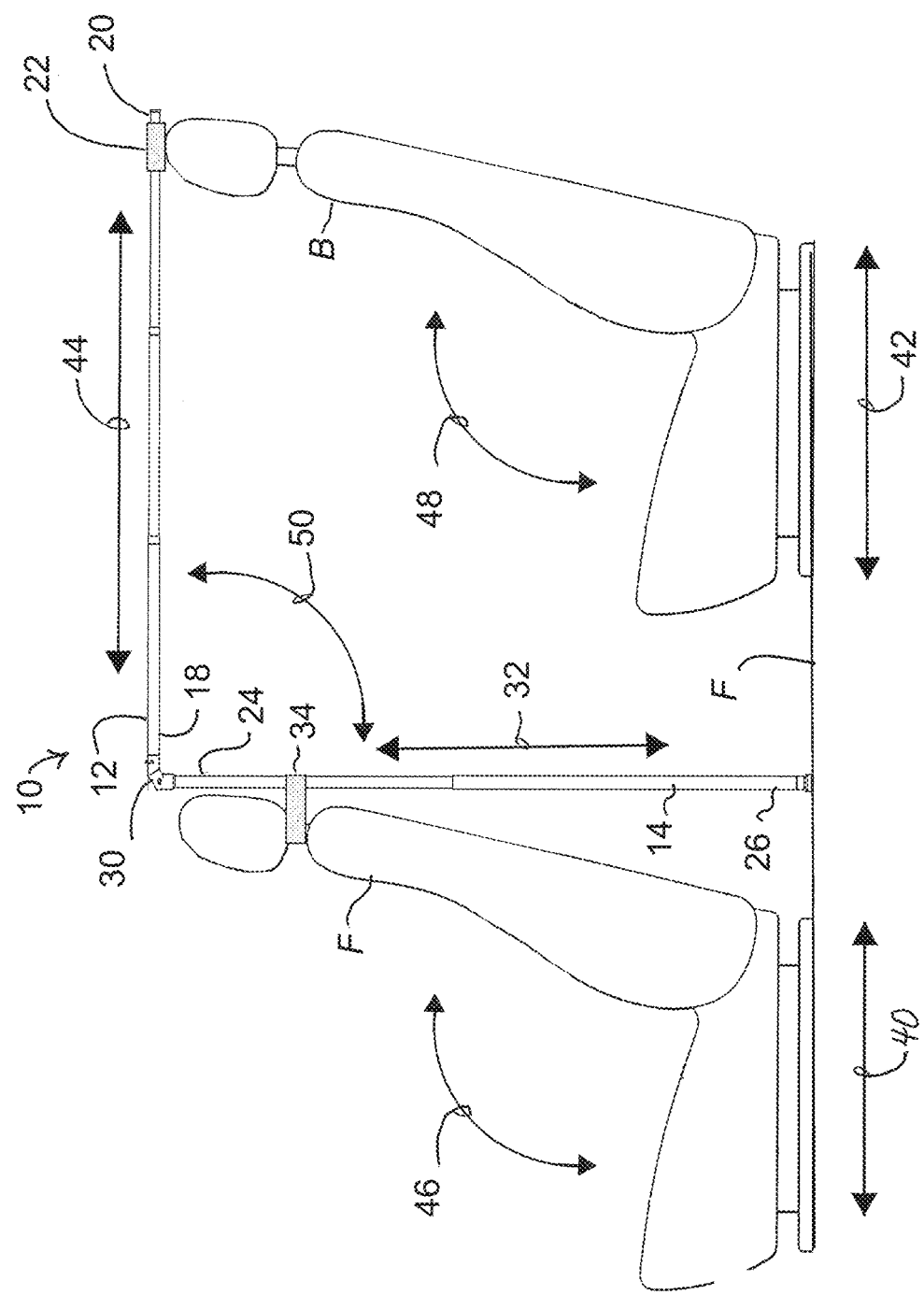
FIG. 1 is a schematic illustration of a vehicle garment rack made in accordance with an embodiment of the present invention and installed between the front and rear seats in a vehicle.

The inventive clothes rack, shown schematically in FIG. 1 and designated generally at 10, is designed for use in any vehicle with at least two rows of seats. As illustrated in FIG. 1, the vehicle includes a front seat F and a back seat B, both of which are supported on a floor F. The back seat B is behind and longitudinally aligned with the front seat F, which may be either the driver's seat or a passenger seat. It will be understood that the rack 10 is equally suited for use between a second row and a third row of seats in a larger vehicle or van with three or more rows of seats. Thus, "front seat" and "back seat," as used herein, refer to the relative positions of the seats to each other; "front seat" is not limited to the first row of seating, and "back seat" is not limited to the rearmost seats in the vehicle. Thus, the rack 10 adapts equally well to sedans, sport utility vehicles, vans, and even to trucks with at least one back seat in the cab.

The rack 10 extends longitudinally between the back of the front seat F to the head rest or top of the back seat B. This arrangement prevents the rack 10 and any clothes on it from obscuring the rear view of the driver. This arrangement also prevents the clothes rack 10 from occupying the entire back seat; even when supporting numerous clothing items, there is still room for at least one and possibly two passengers in the back seat.

As shown in FIG. 1, in one embodiment the rack 10 comprises a horizontal rod 12 and a front support, such as the vertical leg 14. The horizontal rod 12 has a front end 18 and a rear end 20 and may comprise two or more telescopically engaged tubular members as described in more detail hereafter. The rear end 20 of the horizontal rod 12 is removably connectable to the top of the back seat B. Hook and loop fasteners are an effective connector for this purpose. A ring 22a of hook and loop fastener may be provided on the rear end 20 of the rod 12, and a patch or strip 22b of mating hook and loop fastener (FIGS. 2-4) may be applied to the top of the back seat B. While details of construction may vary, it is ideal for the telescoping tubular member to move slidably relative to each with little resistance as this will allow extension and retraction of the rod 12 in response to movement of the front and back seats of the vehicle.

Referring still to FIG. 1, the vertical leg 14 has a top end 24 and a bottom end 26. A pivotal joint 30 connects the front end 18 of the horizontal rod 12 and the top end 24 of the vertical leg 14. To accommodate various sizes of seats, the vertical leg 14 may be longitudinally adjustable in the directions of the arrow 32. To that end, the leg 14 may comprise at least two telescopically engaged tubular members and a twist lock connector, as described below.

The vertical leg 14 is removably and adjustably connectable to the front seat F. For this purpose, the rack 10 may include a simple strap or loop 34. By way of example, the strap 34 may connect to itself or to the vertical leg 14 using hook and loop fasteners (not shown). In most modern vehicles, the headrest of the front seat F is adjustably mounted on at least one post and often two vertically extending posts (not shown). Conveniently, the front support strap 34 may be configured to attach the top end 24 of the vertical leg 14 to the headrest mounting post, as illustrated in FIG. 1. The strap 34 preferably is configured to wrap around one or both of the vertical posts that support the headrest of the front seat.

The bottom end 26 of the vertical leg 14 is engageable with the floor F of the vehicle, as explained more fully below. Now it will be apparent that the horizontal rod 12 and the vertical leg 14 are configured so that the weight of clothing and other items on the horizontal rod 12 will be transferred to the floor F and thus the chassis of the vehicle.

With continuing reference to FIG. 1, the operation of the garment rack 10 will be explained. In most vehicles, the seats F and B are adjustable longitudinally in the directions of the arrows 40 and 42. With the vertical leg 14 secured to the front seat F by the strap 34, and the rear end 20 of the horizontal leg 12 secured to the top of the back seat B by the fastener ring 22, the horizontal leg will automatically extend or retract in the direction of the arrow 44 in response to longitudinal movement of either the front seat F or the back seat B.

It is also common for the degree of tilt of the seat back to be adjustable to increase or decrease the angles indicated at 46 and 48 in both the front and back seats F and B, respectively. As the tilt angle of either seat F or B is adjusted, the length of the horizontal rod 12 simultaneously adjusts as well. In addition, the joint 30 also allows automatic adjustment of the angle formed by the rod 12 and the vertical leg 14, indicated at 50. Thus, even when the rack 10 is installed in the vehicle and loaded with clothing items, neither longitudinal positioning of the seats nor tilt adjustment of the seat backs is inhibited. There is no need to separately adjust the position of the rack 10 when either seat F or B is repositioned.

As shown in FIGS. 2-4, the construction of the rack 10 also simplifies storage and transport of the rack. The rack 10 is shown in its fully extended position in FIG. 2. The three tubular members 12a, 12b, and 12c (FIG. 2) of the horizontal rod 12 are extended to their maximum length, as are the two tubular members 14a and 14b of the vertical leg 14 (FIG. 2). As shown in FIG. 2A, the joint 30 may have an angled slope at 30a in the extended position; this allows improved range of movement of the front seat back and head rest. FIG. 3 shows the rack with the rod 12 and leg 14 collapsed, and FIG. 4 shows the collapsed leg and rod folded together. The strap 34 may be used to tie the two members together.

Figure 5:
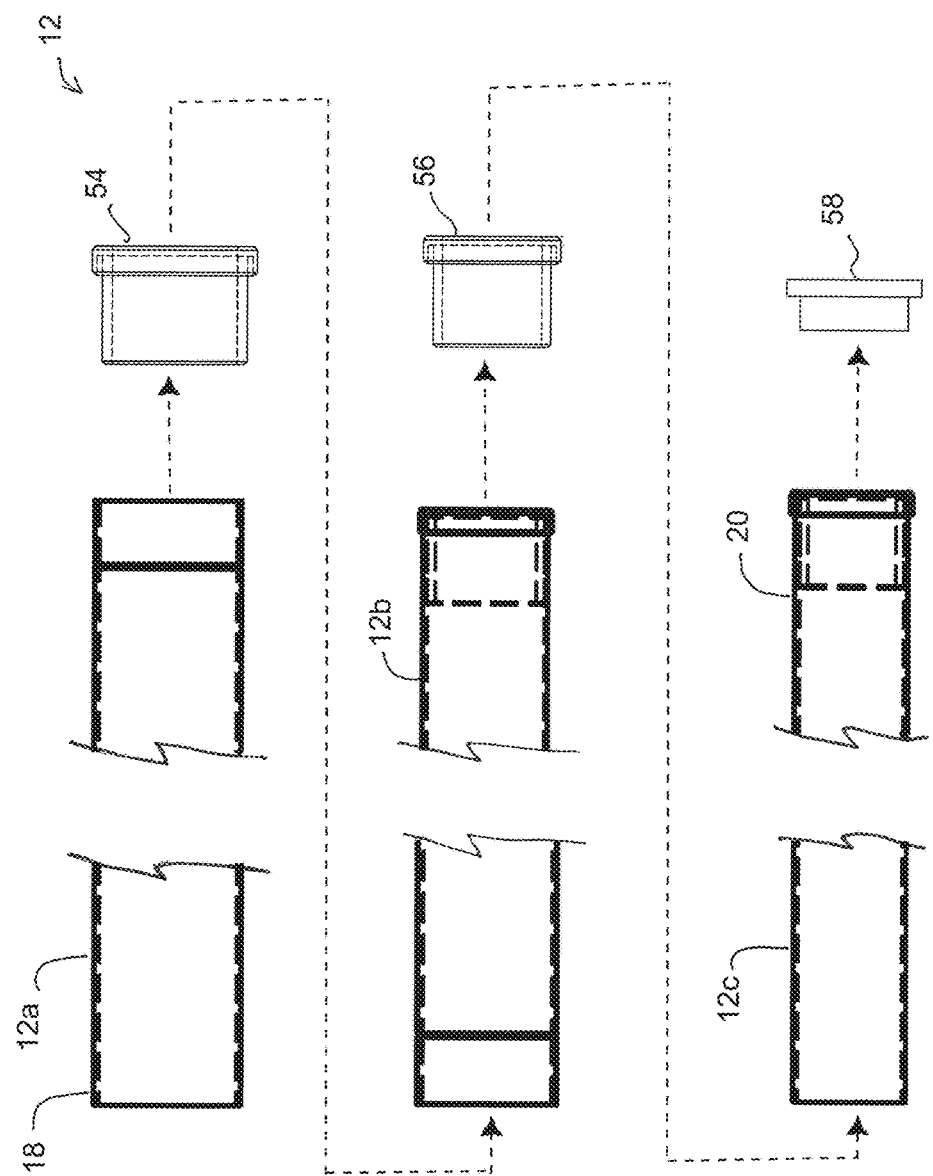
FIG. 5 is an enlarged, exploded view of the vertical leg of the garment rack.

Turning now to FIG. 5, one preferred construction of the horizontal rod 12 will be described. As indicated previously, the rod 12 may comprise three telescopically arranged tubular members 12a, 12b, and 12c (FIG. 2). These tubular members may be formed of any suitable material, such carbon steel or aluminum. Annular inserts 54 and 56 may be included at the joints, and an end cap 58 may be provided to close the rear end 20 of the tubular member 12c. The inserts 54 and 56 and end cap 58 may be formed of nylon or other suitable composite material. The front end 18 of the member 12a connects to the joint 30 as explained hereafter. Although not depicted in the drawings, the inserts 54 and 56 may be crimped to the horizontal members 12a and 12b, or otherwise formed, to prevent inadvertent separation of the tubes.

Figure 6:
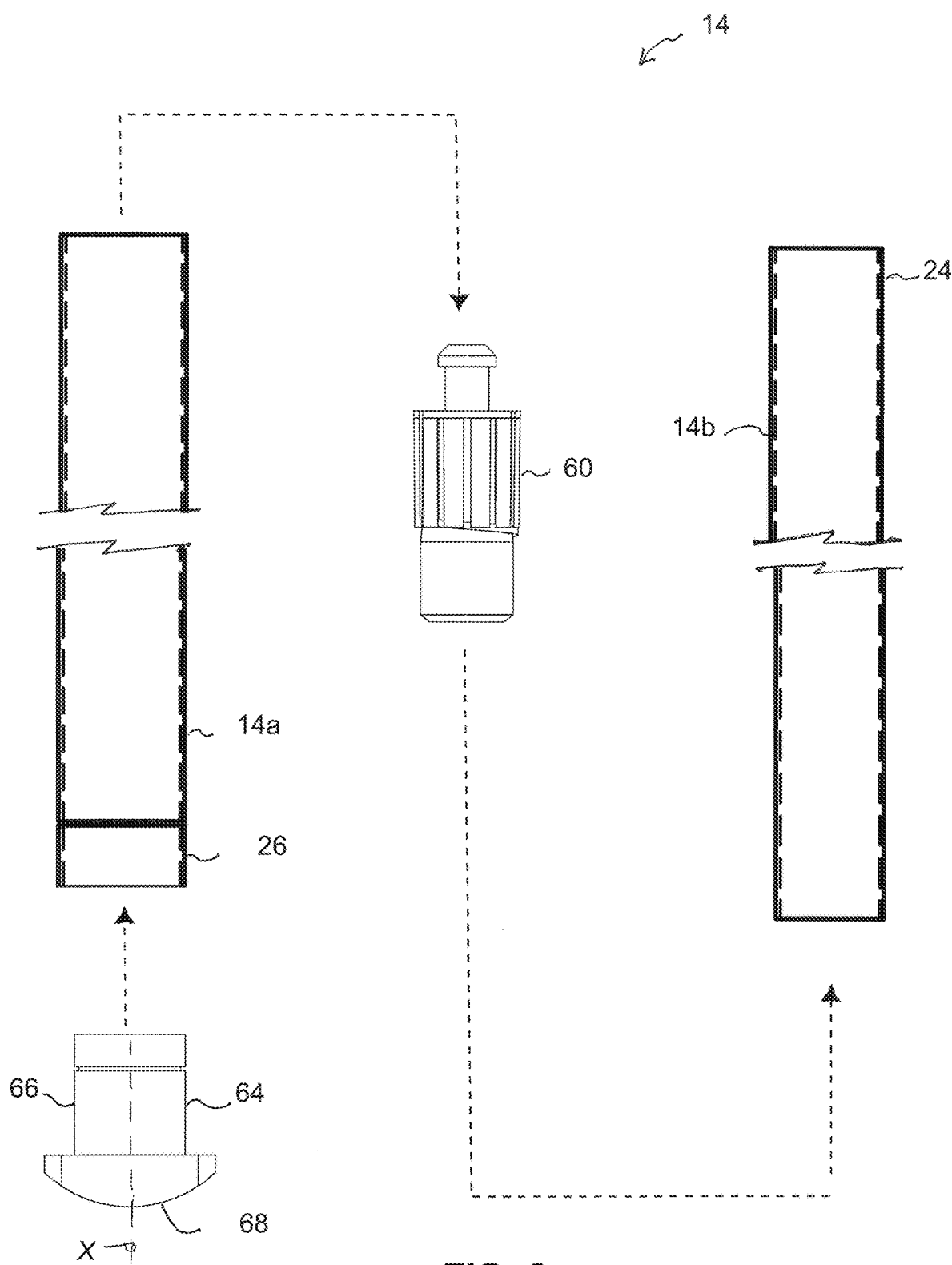
FIG. 6 is an enlarged, exploded view of the horizontal leg of the garment rack.
Figure 9:
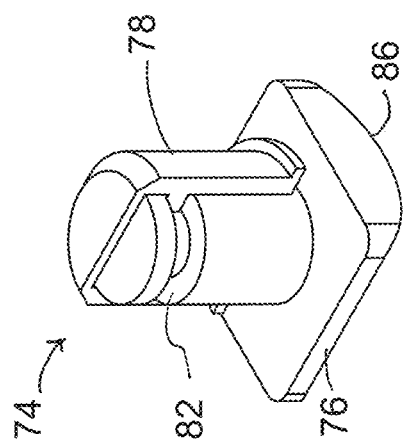
FIG. 9 is a perspective view of the alternate foot assembly of FIG. 8.
Figure 11:
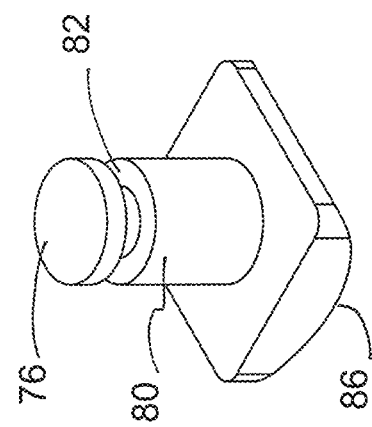
FIG. 11 is a perspective view of the foot of the alternate foot assembly of FIG. 8.
Figure 8:
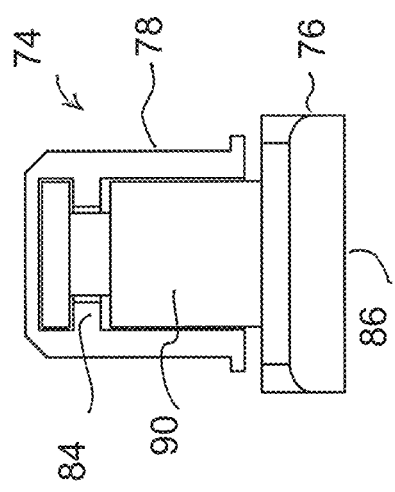
FIG. 8 is a side elevational view of an alternate foot assembly.
Figure 10:
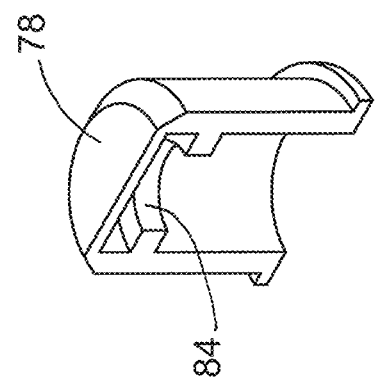
FIG. 10 is a perspective view of the socket of the foot assembly of FIG. 8.

FIG. 6 illustrates an embodiment of the vertical leg 14. As described above, the leg 14 may comprise two telescopically arranged tubular members 14a and 14b (FIG. 2). These tubular members may be formed of any suitable material, such carbon steel or aluminum. The upper end 24 of the member 14b connects to the joint 30 as explained hereafter. Longitudinal adjustment of the length of the leg 14 may be provided by using an internal "twist lock" mechanism 60 of conventional construction. This allows the length of the leg 14 to be easily changed and then secured in position. The adjustment mechanism should be selected to provide the strength necessary to support the weight of a fully loaded horizontal rod 12.

A foot 64 may be included at the bottom end 26 of the member 14a. The particular shape and mode of attachment to the leg 14 may vary. In this embodiment, the foot 64 has a stem 66 that is insertable into the bottom of the member 14 and secured by crimping or other suitable technique. Ideally, the foot 64 will be secured in a manner that permits the foot to rotate along its vertical axis X. Additionally, it is advantageous for the bottom 68 of the foot to be curved; this will allow the foot to rock forward or backward slightly as the vertical leg 14 leans forward or backward when the rack 10 is being adjusted.

Figure 7:
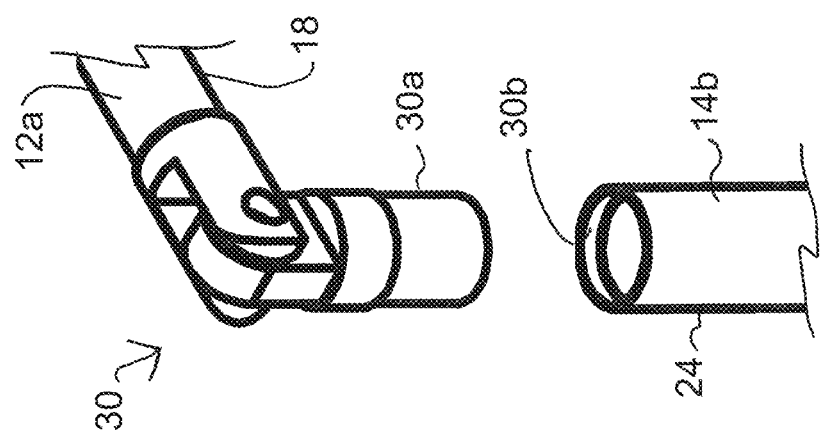
FIG. 7 is a perspective view of the hinge.

With reference now to FIG. 7, a suitable pivot joint 30 is shown. In this embodiment, the joint 30 is a common "knuckle" joint, but the type and configuration of the joint may vary. It is desirable for the joint 30 to be fixed permanently or semi-permanently to the front end 18 of the horizontal rod 12 and removably attached to the top end 24 of the vertical leg 14, or vice versa. In the embodiment shown, the joint 30 is fixed to the front end 18 of the rod 12.

The preferred joint 30 includes a releasable slip fit connection. As seen in FIG. 7, the joint may include a male member 30a extending from the joint 30 and a female member 30b to be secured in the open end 24 of the vertical leg member 14b, although this arrangement could be reversed. In this way, the front end 18 of the rod 12 can simply be lifted off the top end 24 of the vertical leg 14, as illustrated in FIG. 7. Now it will be appreciated that with this "lift out" connection at the joint 30 and the simple hook-and-loop fastener holding the rear end 20 of the rod 12 to the top of the back seat B, the horizontal rod 12 can be lifted off the leg 14 and the back seat even with clothing items hanging on it. This allows all the hanging items and the rod 12 to be removed from the vehicle and carried together as a unit to another location. Returning briefly to FIG. 2A, a stop 70 may be provided on the top of the joint 30 (or on the front end 18 of the horizontal rod 12) to prevent the clothes hangers from slipping off the front of the rack 10.

An alternate foot assembly 74 is shown in FIGS. 8-11. The foot assembly 74 comprises a similar foot member 76 that cooperates with a socket 78. The foot 76 has a stem 80 with a circumferential groove 82. The socket 78 is a generally longitudinal half of a cylinder with a flange 84, while the stem 80 is a full cylinder. Thus, the groove 82 in the stem 80 receives the flange 84 formed inside the socket 78. Once assembled, the socket 78 is glued inside the end 26 of the leg member 14a. This allows the foot member 76 to rotate freely inside the socket 78 and yet be secured against axial movement, that is, removal of the stem 80 from the socket 78 is prevented once the foot assembly 74 is secured in position. Again, the bottom 86 of the foot 76 may be curved; this will allow the foot to rock forward or backward slightly as the vertical leg 14 leans forward or backward when the rack 10 is being adjusted.

The embodiments shown and described above are exemplary. Many details are often found in the art and, therefore, many such details are neither shown nor described herein. It is not claimed that all of the details, parts, elements, or steps described and shown herein are newly invented. Changes may be made in the details, especially in matters of shape, size, and arrangement of the parts, within the principles of the invention to the full extent indicated by the broad meaning of the terms in the attached claims. The description and drawings of the specific embodiments herein do not point out what an infringement of this patent would be, but rather provide non-limiting examples of how to use and make the invention. Likewise, the abstract is neither intended to define the invention, which is measured by the claims, nor is it intended to be limiting as to the scope of the invention in any way. The limits of the invention and the bounds of the patent protection are measured by and defined in the following claims.

What is claimed is:

1. A garment rack for a vehicle, wherein the vehicle comprises a front seat with a headrest, the headrest of the front seat being adjustably mounted on at least one post, and a back seat with a top, the back seat being aligned with and behind the front seat, and both the front and back seat being supported on a floor, the garment rack comprising:
- a horizontal rod having a front end and a rear end, the horizontal rod comprising at least two telescopically engaged tubular members, and wherein the rear end is removably connectable to the top of the rear seat;
- a front support comprising a vertical leg having a top end and a bottom end;
- a front support strap configured to removably attach the top end of the vertical leg of the front support to the headrest mounting post; and
- a pivotal joint between the front end of the horizontal rod and the front support.

2. The garment rack of claim 1 wherein the bottom end of the vertical leg is engageable with the floor of the vehicle and wherein the horizontal rod and the vertical leg are configured so that the weight on the garment rack is transferred to the floor of the vehicle.

3. The garment rack of claim 2 wherein the bottom end of the vertical leg comprises a foot.

4. The garment rack of claim 3 wherein the foot has a curved bottom.

5. The garment rack of claim 4 wherein the foot is rotatably attached to the bottom end of the vertical leg.

6. The garment rack of claim 1 wherein the pivotal joint is a knuckle joint.

7. The garment rack of claim 1 wherein the vertical leg is longitudinally adjustable.

8. The garment rack of claim 7 wherein the vertical leg comprises at least two telescopically engaged tubular members and a twist lock connector.

9. The garment rack of claim 1 wherein the two telescopically engaged tubular members of the horizontal rod are slidably engaged to allow extension and retraction in response to movement of the front and back seats of the vehicle.

10. The garment rack of claim 1 wherein the joint is fixed to one of the front end of the horizontal rod and the top end of the vertical leg and is removably attached to the other one of the front end of the horizontal rod and the top end of the vertical leg.

11. The garment rack of claim 10 wherein the joint comprises a male member on one of the joint and the top end of the vertical leg and a female member on the other one of the joint and the top end of the vertical leg thereby forming a releasable slip fit connection.

12. The garment rack of claim 1 further comprising a hook and loop fastener on the rear end of the horizontal rod and a mating hook and loop fastener attachable to the top of the back seat.

13. The garment rack of claim 12 wherein the joint is fixed to one of the front end of the horizontal rod and the top end of the vertical leg and is removably attached to the other one of the front end of the horizontal rod and the top end of the vertical leg, wherein the joint comprises a male member on one of the joint or the top end of the vertical leg and a female member on the other one of the joint or the top end of the vertical leg thereby forming a releasable slip fit connection, whereby the horizontal rod is removable by only lifting the horizontal rod to disengage the hook and loop fasteners at the rear end of the rod and to separate the slip fit connection between the front end of the horizontal rod and the top end of the vertical leg.

14. A vehicle equipped with the garment rack of claim 1.

* * * * *

UNITED STATES PATENT AND TRADEMARK OFFICE
CERTIFICATE OF CORRECTION

PATENT NO. : 10,640,051 B2
APPLICATION NO. : 16/165088
DATED : May 5, 2020
INVENTOR(S) : Ronald L. Strahan Page 1 of 1

It is certified that error appears in the above-identified patent and that said Letters Patent is hereby corrected as shown below:

On the Title Page

Item (73) Assignee: replace "Redmond (CA)" with --Edmond (OK)--.

Signed and Sealed this
First Day of September, 2020

Andrei Iancu
*Director of the United States Patent and Trademark Office*